United States Patent [19]

Brcic et al.

[11] 4,249,129
[45] Feb. 3, 1981

[54] EFFICIENT SIMULTANEOUS ELECTROMAGNETIC TRANSMISSION OR RECEPTION AT DIFFERENT FREQUENCIES IN ELECTROMAGNETIC MAPPING

[75] Inventors: Ivo Brcic, Willowdale; Valentine Burda, Schomberg; Ulrich W. Rentsch, Thornhill, all of Canada

[73] Assignee: Scintrex Limited, Concord, Canada

[21] Appl. No.: 25,760

[22] Filed: Apr. 2, 1979

[51] Int. Cl.³ .................. G01V 3/10; G01V 3/165
[52] U.S. Cl. ............................... 324/335; 324/330
[58] Field of Search ............... 324/329, 330, 334, 335, 324/232, 242, 243; 340/38 L, 551, 552

[56] References Cited

U.S. PATENT DOCUMENTS

| 2,451,596 | 10/1948 | Wheeler | 324/329 |
| 2,557,994 | 6/1951 | Ostlund | 324/329 X |
| 2,642,477 | 6/1953 | Puranen et al. | 324/335 |
| 2,955,250 | 10/1960 | Shaw et al. | 324/335 X |
| 3,012,190 | 12/1961 | Doll | 324/335 X |

FOREIGN PATENT DOCUMENTS

| 960966 | 4/1950 | France | 324/334 |

*Primary Examiner*—Gerard R. Strecker
*Attorney, Agent, or Firm*—Sim & McBurney

[57] ABSTRACT

This invention relates to electromagnetic mapping wherein magnetic fields of two or three different and normally audio frequencies may be transmitted or received efficiently using induction coils with the same orientation and essentially the same spatial location. Flat, air cored coils are used and are overlapped so as to have essentially zero mutual inductance between pairs.

1 Claim, 6 Drawing Figures

EFFICIENT SIMULTANEOUS ELECTROMAGNETIC TRANSMISSION OR RECEPTION AT DIFFERENT FREQUENCIES IN ELECTROMAGNETIC MAPPING

This invention relates generally to methods and apparatus for electromagnetic exploration for electrically conducting ore bodies and like electrically conducting anomalies. The general method is very well known and widely used. One transmits an alternating electromagnetic field into an area to be explored; the alternating electromagnetic field induces eddy currents in an electrically conducting ore body or like anomaly; the eddy currents give rise to an electromagnetic field of their own and affect the resultant electromagnetic field in the area; and the existence of the eddy currents and hence the anomaly is detected by detecting the resultant electromagnetic field in the area.

Transmitter and receiver coil arrangements vary, the frequencies used vary, the measured characteristics of the resultant field that is measured vary and the apparatus used to create and measure the field varies in the practice of the general method. Differing variations suit differing conditions.

This invention is particularly concerned with airborne electromagnetic exploration equipment and methods where the transmitting equipment and the receiving equipment is mounted on an aircraft and where two or more electromagnetic fields of different frequencies are transmitted and received in the search for hidden electrically conducting anomalies. The invention is not restricted, however, to airborne electromagnetic exploration.

For certain practical applications it becomes desirable to create audio frequency magnetic fields of two or more different frequencies whose sources have essentially the same orientation and are located in the same region of space. One example of such an application is multifrequency airborne electromagnetic prospecting. For example, see "Mapping Earth Conductivities Using a Multi-Frequency Airborne Electromagnetic System" by H. O. Seigel and D. H. Pitcher, Geophysics, Volume 43, No. 3, April, 1978.

This invention provides a way of mounting the transmitting coils and/or the receiving coils in cases where the transmitting coils are close together and/or the receiving coils are close together that avoids the problems of prior art, which problems now will be discussed. However, as it will be necessary to refer to one of the appended drawings in discussing such problems, these drawings will be described first.

FIG. 1 illustrates two transmitting coils in circuit diagram form;

FIG. 2 schematically illustrates an embodiment of this invention;

Figure 5:
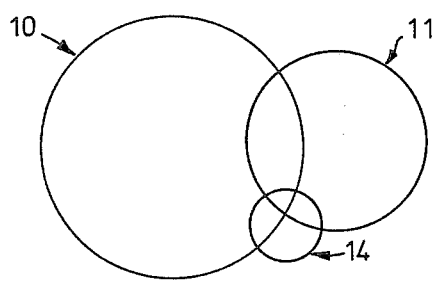
Figure 6:
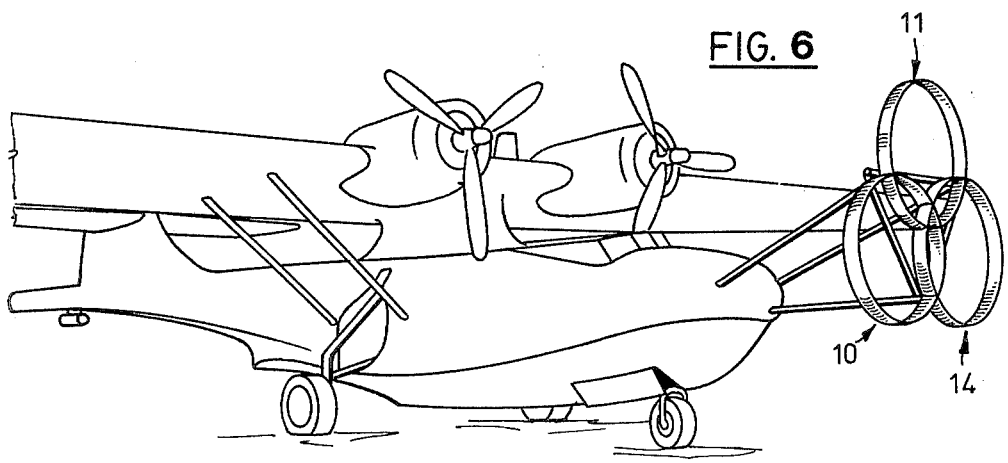

FIG. 5 schematically depicts another embodiment of the invention employing three coils; and FIG. 6 shows three transmitting coils arranged in accordance with the invention and mounted on an aircraft.

Figure 1:
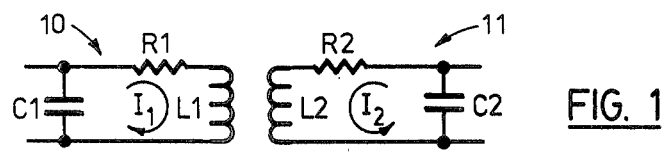

The problems which arise when simultaneous transmissions of two or more different frequencies at essentially the same point in space are attempted are twofold. They are illustrated by FIG. 1, which shows two transmitter coils 10 and 11. The first coil has self-inductance $L_1$, tuning capacitance $C_1$ and resistance $R_1$ and resonates at a frequency $f_1$ given by $$f_1 = \tfrac{1}{2}\pi \sqrt{L_1 C_1} .$$

The second coil has self-inductance $L_2$, tuning capacitance $C_2$ and resistance $R_2$. It is tuned to resonate at a frequency $f_2$ given by $$f_2 = \tfrac{1}{2}\pi \sqrt{L_2 C_2} .$$

There will be inductive coupling between the two coils due to their mutual inductance M. Because of this coupling, the current $I_1$ flowing in the coil 10 will be reduced and phase shifted from its normal (uncoupled) value as though an impedance had been added in series with the impedance of coil 10. The additional impedance may be expressed as $\Delta Z_1 = (2\pi f_1 M)^2 / Z_2$, where $Z_2$ is equal to the series impedance of the coil 11 at the first frequency, namely $$R_2 + j(2\pi f_1 L_2 - \tfrac{1}{2\pi f_1 C_2}).$$

In addition, a circulating current will be set up in coil 11 which is largely in spatial opposition to that in coil 10. As well, there will be a phase shift between the $f_1$ circulating current in coil 11 and that in coil 10.

Expressed in other terms, the effects of coil 11 on coil 10 are: a. to reduce the circulating $f_1$ current in coil 10 by increasing its effective impedance and, b. to act as a disturbing conductor in proximity to coil 10, thus permitting the creation of eddy currents. These eddy currents tend to be in opposition to those in coil 10 and thus reduce the effective moment of coil 10 at any distant point.

In addition, the conductor created by coil 11 is not a very stable one because its various circuit parameters are often temperature dependent and therefore may vary with time. This can produce another sort of time varying system noise.

Similar comments may be made about the deleterious effects of coil 10 on the transmission of electromagnetic fields by coil 11.

An equivalent problem arises when two or more receiving coils are used to simultaneously detect a component of the same orientation of two or more electromagnetic signals of different frequencies, at essentially the same point in space, in order to be able to compare these fields.

Attempts have been made to reduce this problem by spatially separating the transmitting coils and by spatially separating the receiving coils so that their mutual inductance becomes small. However, in airborne electromagnetic systems and in other electromagnetic prospecting systems as well, often it is highly desirable to have an effective identity in location and orientation of the magnetic field sources or sensors. This identity allows certain essential comparisons to be made between the electromagnetic signals (and the disturbances caused by the earth thereto) at the different frequencies. In most airborne applications therefore, one is very limited in one's ability to physically separate the various coils without destroying their effective identity of location and orientation.

It is an object of an aspect of this invention to provide the means whereby two or more transmitting or receiving coils may be placed in close spatial relationship without appreciably affecting the original moment of each coil or causing one coil to appear as a conductive load in respect of the other.

In accordance with one aspect of this invention there is provided electromagnetic exploration apparatus comprising means for simultaneously transmitting electromagnetic fields of three different frequencies, means for receiving transmitted electromagnetic fields of three different frequencies, at least one of said transmitting means and said receiving means including three air cored coils each lying in its own plane and having an axis perpendicular to its plane, said coils being mounted with their axes at least substantially parallel and with their planes closely spaced and at least substantially parallel, each coil being overlapped sufficiently with respect to the other two coils that the mutual inductance of said three coils is at least substantially zero.

This invention will become more apparent from the following detailed description.

Figure 2:
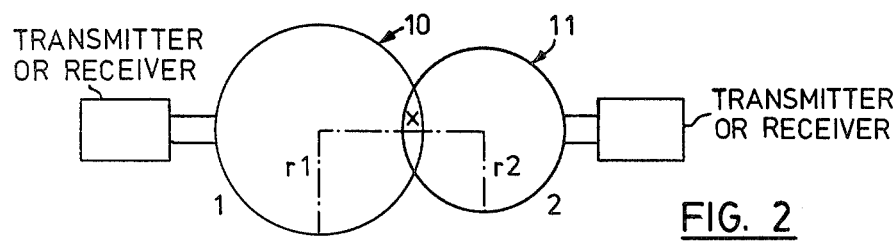

In FIG. 2 are shown transmitters (or receivers) which include the coils 10 and 11 of FIG. 1. These coils are air cored and usually will be constructed so that the cross section of their windings will be small compared to their radii $r_1$ and $r_2$. The centers of the two coils are designated as 12 and 13 respectively. The center of each coil is exterior to the other coil. The coils are made to lie superimposed on one another so that their axes are parallel and their planes are parallel and as close together as possible. Coils 10 and 11 are made to overlap somewhat so that there is a common area of width X measured along the common radius. If the magnetic flux in coil 11 due to circulating current in coil 10 is considered, it can be seen that it will differ in sense in the overlap area from that in the area exterior to the overlap area.

Figure 3:
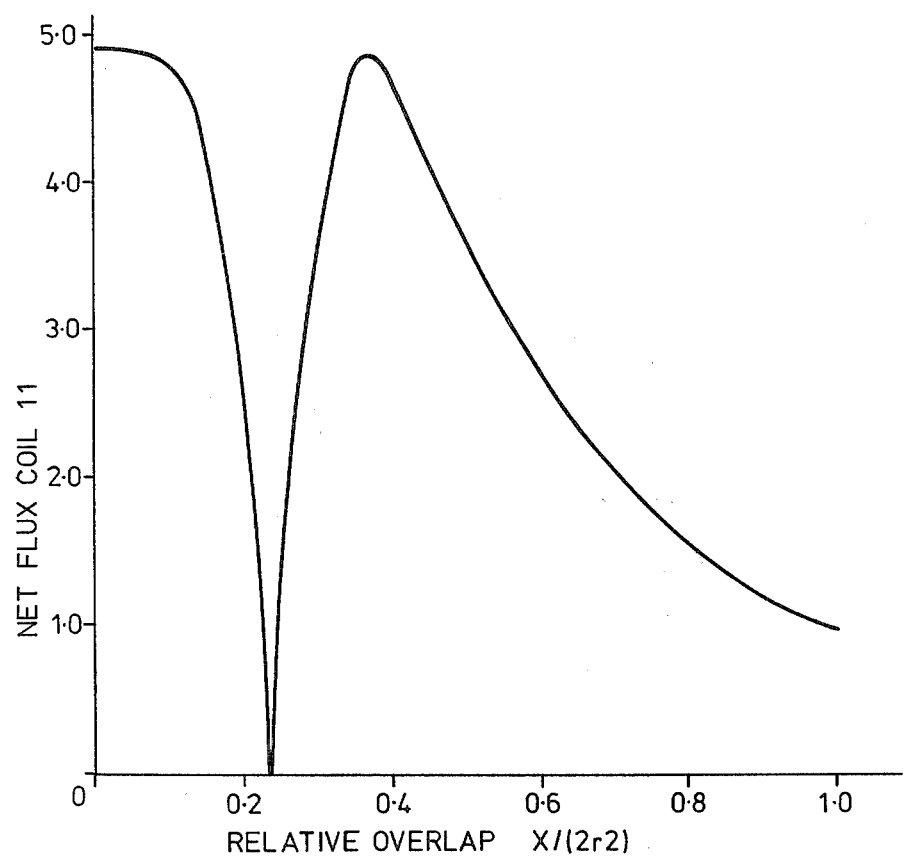
FIG. 3 is a graph showing the change in net flux in one of the coils of FIG. 2 due to circulating current in the other coil with increasing overlap of the coils.

FIG. 3 shows the change in net flux in coil 11 due to circulating current in coil 10 with increasing overlap of the coils. The net flux is plotted against the relative overlap, which is defined as $X/2r_2$; i.e., the ratio of the overlap width to the diameter of coil 11. FIG. 3 has been plotted for two coils 10 and 11 of identical radii.

Referring to FIG. 3, for no overlap the net flux is at a maximum. As the overlap increases, the net flux decreases progressively and reaches zero for a relative overlap of 0.235. For increasing overlap, the contribution from the overlap area starts to predominate and the net flux increases (with reverse polarity) beyond this null point.

Figure 4:
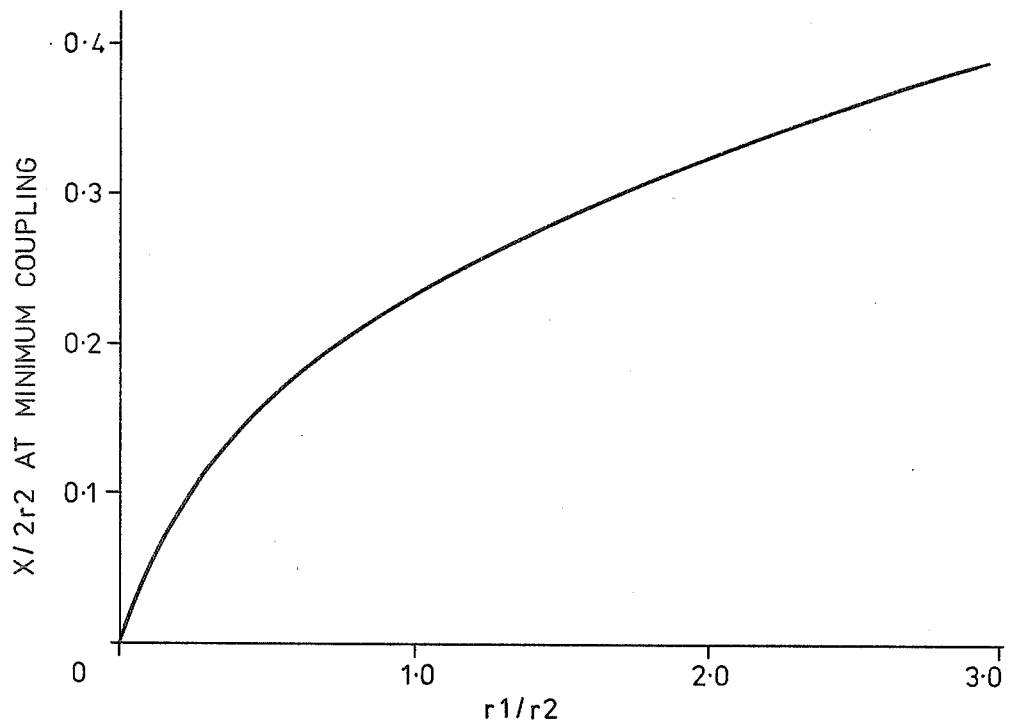
FIG. 4 is a plot of the relative overlap of two coils of radii $r_1$ and $r_2$ at the null point (zero net flux) against the ratio of $r_1$ to $r_2$.

The overlap for zero coupling depends on the ratio of the radii of coils 10 and 11. FIG. 4 shows a plot of the relative overlap at the null against the ratio of $r_1$ over $r_2$. It is clear from FIG. 4 that whatever the ratio of the radii may be, there is always a degree of overlap of the two coils where the net flux through coil 10 due to circulating current in coil 10 will be zero. From FIG. 4 it may be noted that as $r_1/r_2$ becomes very large, the value of $X/2r_2$ at the null point approaches the limiting value of 0.5. This means that if a very small coil is placed adjacent to a very large coil, it will have minimum coupling when it straddles the circumference of the large coil. In any event, the centers of the two coils never lie within the circumference of either coil at the minimum coupling position.

While the foregoing discussion relates to the relative position of the two coils where there is no resultant flux from coil 10 into coil 11, by the theory of electrical reciprocity, it may be seen that in the same configuration there will be no flux from coil 11 into coil 10. In other words, there will always be a position of relative overlap of two coils of this type wherein there will be no mutual inductance between the two coils. In this position M is zero. There will then be no major adverse interaction between the two coils when used as transmitting coils or as receiving coils. The impedance of one coil will not affect the impedance of the other and thus create losses. There will be no circulating eddy currents set up in the plane of each coil to reduce the moment of each coil and no potential instability of transmitter moment will be caused because of varying impedances that may arise.

It is also feasible to place three air cored coils so as to have zero coupling between all three coils. This is shown in FIG. 5. Firstly, two coils 10 and 11 are placed in their null configuration. The third coil 14 then is placed in null configuration with one of coils 10 and 11 and then the third coil 14 is moved, maintaining its null configuration relative to the one of the two coils 10 and 11, around the circumference of such one coil until it lies also in its required null position relative to the other of the two coils 10 and 11.

Three coils represents the maximum number which may be placed in the same plane in a completely null coupling. Any additional coil may assume a null coupling with, at most, two of the other coils.

While there are a number of ways to determine the degree of overlap required to obtain the desired zero net flux configuration, the simplest way is to pass alternating current through one coil and measure the induced voltage in the other coil. The degree of overlap of the coils should be adjusted until the induced voltage measures zero.

FIG. 6 shows one embodiment of this invention. Three transmitter coils 10, 11 and 14 of the same radii are mounted in the overlapping zero coupling configuration of this invention in front of the nose of a twin-engined aircraft. The frequencies employed are 500 Hz, 2000 Hz, and 8000 Hz. Each coil is, for convenience in manufacture, six feet in diameter and no more than 3" in mean cross section. Each has a different number of turns dependent on the transmitter moments required. The axes of the three coils are parallel, and the planes of the three coils likewise are parallel and are located as close together as possible, the limitation here being the thicknesses of the coils where they overlap each other.

The plane of the three transmitter coils 10, 11 and 14 is approximately 10' from the nose of the aircraft, so that the damping effect on the aircraft on the alternating electromagnetic field at a distance from the aircraft is less than 10%.

The separation of the transmitting coils from the location of the receiver coils, which is in a tail stinger at the rear of the aircraft, is 85'.

This particular embodiment of this invention measures the change, due to ground conductors, in the electromagnetic signal from the three transmitters, at the receiver location. The change is measured in terms of differences in the in-phase and quadrature components at each of the three frequencies expressed in terms of parts per million of the normal (undisturbed) field from the transmitters.

While the foregoing description has been primarily with respect to coils used for the simultaneous transmission of time varying magnetic fields at different frequencies, the invention also is applicable to air cored coils used to receive such signals simultaneously. The importance of eliminating the mutual inductance between coils used as receiving coils is to maximize their sensitivity, minimize their impedance and reduce the effect of drifts associated with temperature changes in this impedance.

We claim:

1. Electromagnetic exploration apparatus comprising means for simultaneously transmitting electromagnetic fields of three different frequencies, means for receiving transmitted electromagnetic fields of three different frequencies, at least one of said transmitting means and said receiving means including three air cored coils each lying in its own plane and having an axis perpendicular to its plane, said coils being mounted with their axes at least substantially parallel and with their planes closely spaced and at least substantially parallel, each coil being overlapped sufficiently with respect to the other two coils that the mutual inductance of said three coils is at least substantially zero.

* * * * *